May 10, 1966  M. PERLMAN  3,250,296
SINGLE LEVER VALVE WITH PREADJUSTMENT TEMPERATURE CONTROL
Filed Sept. 30, 1963  3 Sheets-Sheet 2
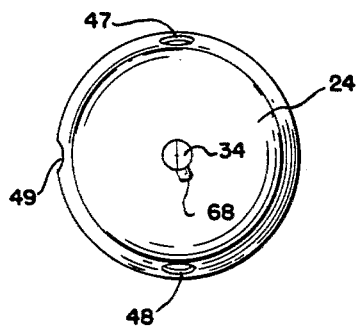
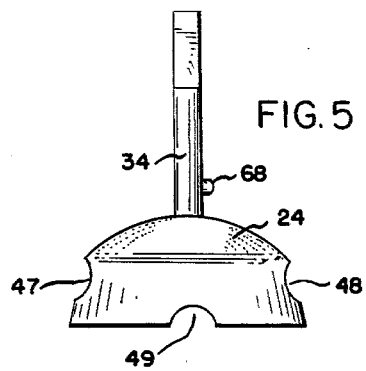
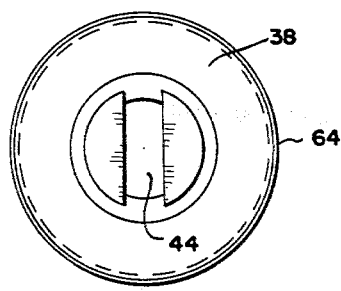
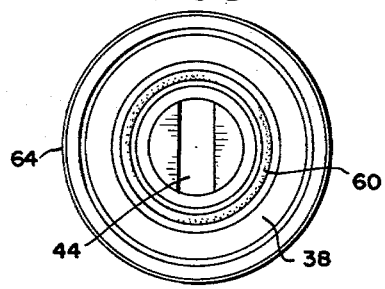
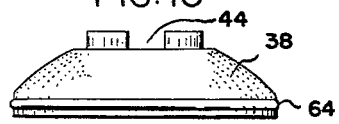
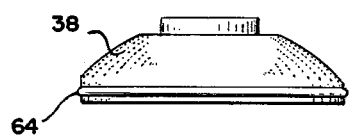
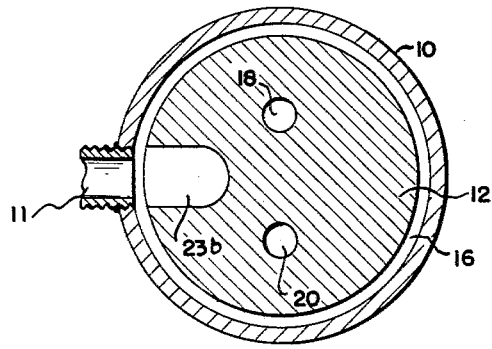
INVENTOR.
MILTON PERLMAN.
BY
ATTORNEYS

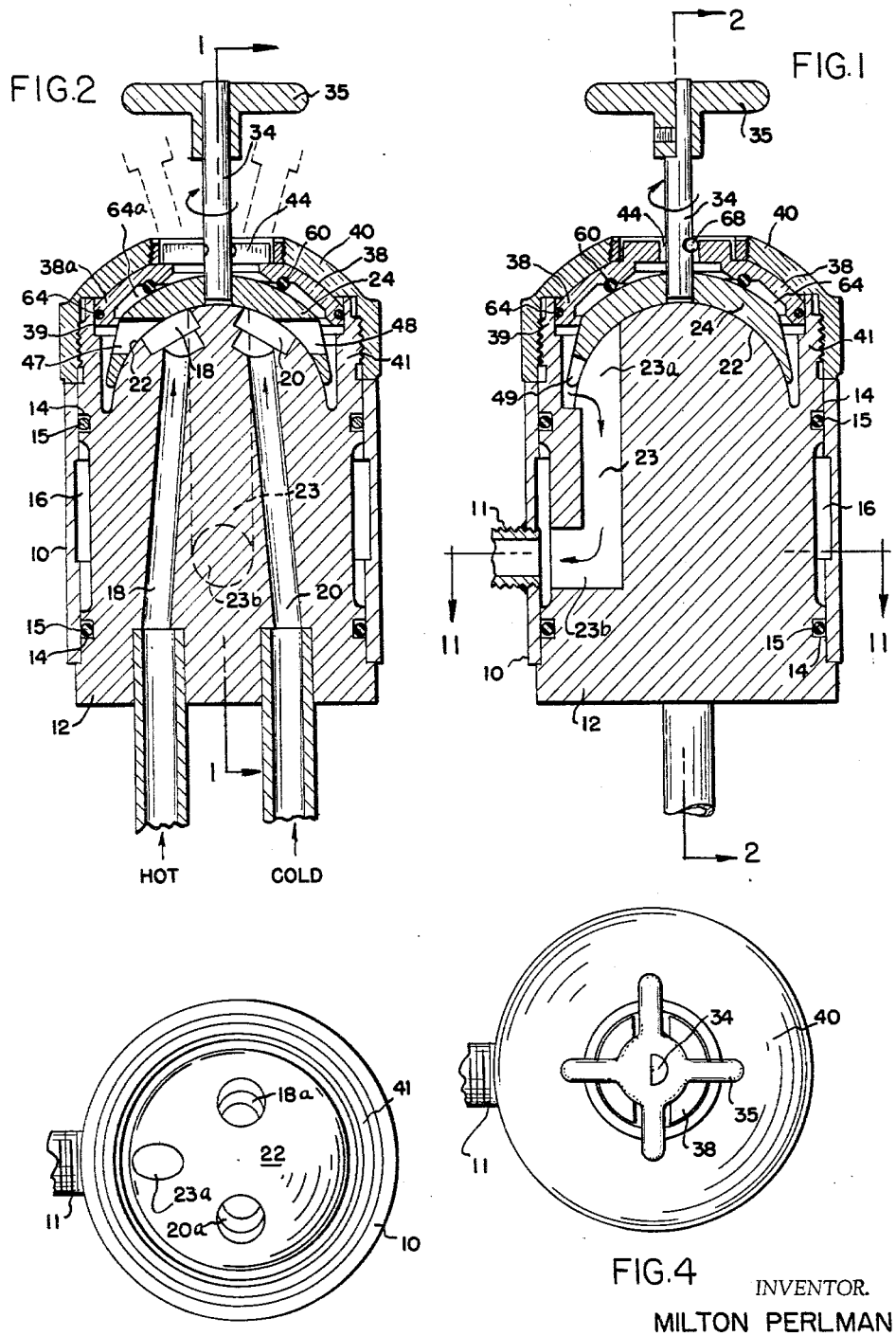

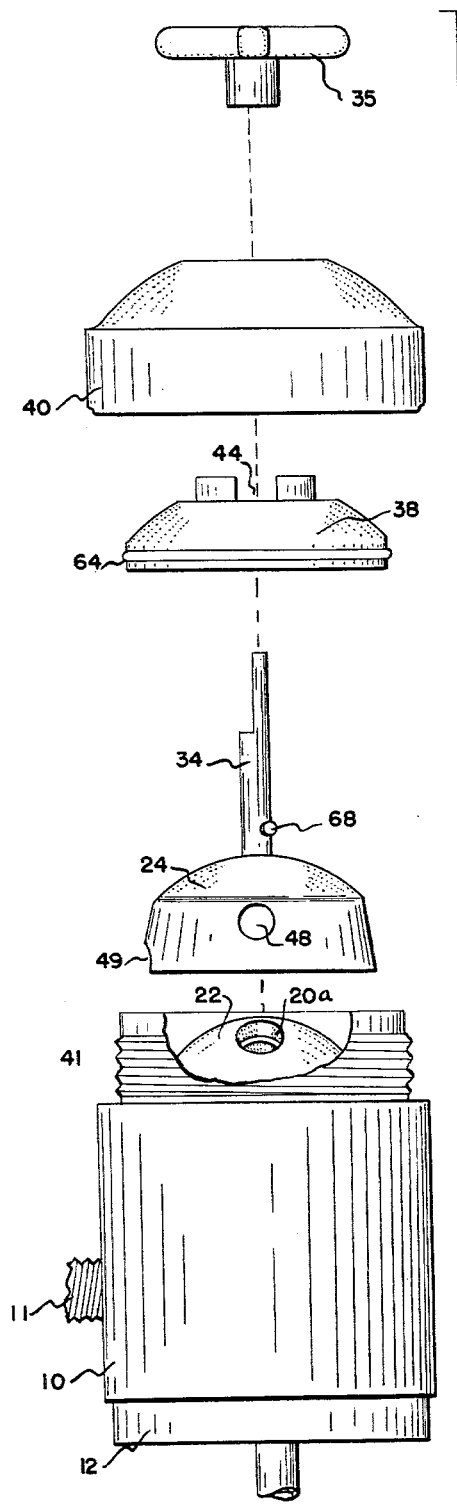

United States Patent Office 3,250,296
Patented May 10, 1966

3,250,296
SINGLE LEVER VALVE WITH PREADJUSTMENT
TEMPERATURE CONTROL
Milton Perlman, 1278 Biscayne Bay Drive, Detroit, Mich.
Filed Sept. 30, 1963, Ser. No. 312,424
10 Claims. (Cl. 137—625.4)

This application relates to single lever valves for use in outletting desirable mixtures of hot and cold water as desired, both as to temperature and quantity or volume, all accomplished by the use of a single lever or handle, and delivering or outletting through a single port or spout.

The valve hereof is characterized by several outstanding features.

It is extremely simple of construction resulting in reduced cost of manufacture, installation and maintenance, and permitting servicing by even a rather unskilled householder.

It may be pre-adjusted as to temperature; it may be turned off at any desired temperature setting, and thus turned on again at the same temperature setting.

It is so designed that the tolerances required are reduced to a minimum.

For an understanding of the valve hereof, reference should be had to the appended drawings which disclose a preferred embodiment of such valve.

In these drawings:

FIG. 1 is a vertical section view of the assembled valve as if on line 1—1 of FIG. 2.

FIG. 2 is a vertical section view as if on line 2—2 of FIG. 1.

FIG. 3 is a top plan view of a body part of the valve with its surrounding shell.

FIG. 4 is a top plan view of the assembled valve.

FIGS. 5 and 6 are elevation and top plan views of a valve member of the valve, respectively.

FIGS. 7 and 8 are top plan and bottom plan views of a sealing plate of the valve, respectively.

FIGS. 9 and 10 are side and elevation views of such sealing plate, respectively.

FIG. 11 is a section as if on line 11—11 of FIG. 1.

FIG. 12 is an exploded view of the valve parts.

The valve hereof comprises a cylindrical shell 10 having a spout 11 and surrounding a cylindrical body or core 12 having narrow external grooves 14 containing sealing rings 15 for sealing the body and shell relatively. Spout 11 opens into an annular groove 16 in body 12. Vertical inlet bores 18 and 20, respectively, adapted to be connected at their lower ends to hot and cold water inlet lines, not shown but indicated, open into the dome-shaped rounded convexed upper end or valve seat 22 of the body 12, and provide inlet ports 18a and 20a. These contain sealing rings, not shown, in their upper ends. A third bore 23, for outletting, also opens to seat 22 of the body. Outlet bore 23 thus provides an outlet port 23a in seat 22. Bore 23 communicates through a transverse horizontal part or bore 23b with the wide annular external channel or groove 16 of body 12, which opens to spout 11 of shell 10.

Against seat 22 of body 12 a concaved valve member 24 is seated to shift forwardly and rearwardly. From its upper convex surface upwardly extends a central stem or handle 34 surmounted by a removable hand grip 35.

Above valve member 24 is a dished sealing plate 38 whose outer edge 38a seals to an annular zone 39 of body 12. Above sealing plate 38 is a domed hold-down cap 40 threaded onto a skirt 41 of body 12.

Stem or handle 34 moves forwardly and back in a north-south path defined by an elongated slot 44 of sealing plate 38.

Valve member 24 has inlet openings 47–48 and an outlet opening 49. Their location determines relative communication among ports 18a, 20a, and 23a Mixing chamber Sealing plate 38 has a sealing ring 60 surrounding stem 34 which seals against the upper surface of valve member 24. Edge 38a of sealing plate 38 has a sealing ring 64 for sealing to annular zone 39 of the body as shown. Thus, a sealed mixing chamber 64a is formed to communicate through valve member openings 47–48–49 to the three ports of seat 22 and provides a sealed mixing chamber of rather large size and volume and above valve member 24 itself, and sealed from slot 44 of sealing plate 38.

For limiting axial rotation or twisting of stem 34 in slot 44 of sealing plate 38, effected by handle 35 on stem 34 there is provided a transverse limit pin 68 fixed to stem 34 which engages the sides of slot 44 to limit axial rotation of stem 34 to about 60°, all that is necessary in the embodiment shown for moving notch 49 of valve member 24 from full open to full closed position relative to the upper end of outlet port 23a.

Assembly and operation

The device is assembled and operated as follows:

First, core or body 12 and shell 10 are assembled as a sub-assembly.

Thereafter valve member 24 is set down on seat 22 with stem 34 vertical and with notch 49 overlying port 23a and with holes 47–48 of valve member 24 being alined with ports 18a–20a as viewed from above.

With the parts thus alined, sealing plate 38 is then placed on valve member 24 with slot 44 being alined with holes 47–48 of valve member 24 and inlet ports 18a–20a.

Then hold-down cap 40 is threaded down over the parts while they are held in the previously described position and the assembly is completed.

Stem 34 is movable in a north-south path coinciding with the north-south axis of cap holes 47–48 and ports 18a, 20a and body inlet as distinguished from the position of ports 23a and valve member notch 49 which is west.

Transverse pin 68 of stem 34 will now be engaging a side of slot 44 to limit axial twisting of stem 34 approximately 60° to cover the range of opening provided by the upper end of port 23a, limiting being effected by the engagement of pin 68 with the sides of slot 44 in sealing plate 38.

For temperature adjustment, stem 34 is shifted north and south. For volume adjustment, stem 34 is rotated axially in whatever position it may happen to be at the moment relative to the ends of slot 44 in sealing plate 38. Thus flow may be shut off at any desired temperature and this presets the valve so that when the valve is once again turned on, by rotating stem 44 axially once more, such rotation may be effected and the valve may be opened at the pre-set temperature determined by the position of stem 34 in slot 44 as previously adjusted.

Now having described the single lever valve of preferred form disclosed in the appended drawings, reference should now be had to the claims which follow.

I claim:
1. In a valve, a body having a convexedly domed upper end formed as a valve seat and provided with two inlet bores opening to said seat as two inlet ports; and also having an annular sealing zone outside said seat;

and a plate-like valve member overlying said seat and having a concave under surface engaging said seat; a stem projecting centrally upwardly from it for shifting it across the seat in response to shifting of the stem and also for rotating it on the seat around the axis of the stem in response to rotation of the stem on its axis;

said valve member being formed with two through inlet openings communicating its under concave surface with its upper surface and for registering with the inlet ports selectively and proportionately as it is shifted across and rotated around the seat;

a sealing cap overlying said valve member and sealed thereto around the stem and also sealed at its outer edge to the body at said annular sealing zone outside the seat to form a sealed mixing chamber above and around the upper surface of the valve member outside the stem, into which mixing chamber open the two openings of said valve member;

said sealing cap having a top central hole through which the stem projects to be exposed as a handle;

said body having an outlet bore opening into said mixing chamber.

2. In a valve, a body having a convexedly domed upper end whose surface is formed as a valve seat and having two generally parallel bores opening to said seat to provide ports therein; and also having an annular sealing zone outside said seat; said ports being inlet ports;

and a plate-like valve member having its under surface concave and overlying said seat for closing or opening said inlet ports and being shiftable across and also rotatable on said seat for closing or opening said inlet ports;

said valve member having two through openings for registering with said inlet ports; said openings communicating the under surface of the valve member with its upper surface;

and having a stem projecting centrally upward from its upper surface to enable the valve member to be shifted across the seat and also to enable the valve member to be rotated on the seat around the axis of the stem; said body having an outlet bore terminating in an outlet port opening into that part of the valve above the upper surface of the valve member.

3. A valve according to claim 2 including a sealing plate above the valve member having a central slot for receiving the stem to limit stem movement, during valve member shifting, to be lengthwise of said slot and in registry with said inlet ports; with the stem being rotatable axially in said slot in any position of the stem in said slot;

said sealing plate having a sealing ring surrounding the slot and engaging the valve member under it to seal said slot from the engaging surfaces of the sealing plate and the valve member;

and also having a sealing ring for sealing to the sealing zone of the body outside the seat to provide a sealed mixing chamber above the valve member.

4. A valve according to claim 3 wherein the body has threaded thereon a removable centrally holed hold-down cap for holding the valve member firmly against the seat and thus against the ports; the valve member stem projecting through the central hole of such cap to be exposed and provide a handle.

5. A valve according to claim 3 wherein the body has secured thereto a hold-down means for holding the sealing plate firmly against the valve member and for holding the valve member against the seat and the ports.

6. A valve according to claim 5 wherein the hold-down means is a removable threaded cap having a central hole and wherein the valve member stem projects through the central hole of such hold-down cap to be exposed and provide a handle.

7. In a valve, a body having two inlet bores, and having a convexedly domed upper end into which said bores open to provide two inlet ports with such upper end being formed as a convex dome seat for a valve member;

said body also having an annular sealing zone outside said valve seat;

and a plate-like valve member whose under surface is concave and seats against said domed seat and having a stem projecting centrally from its upper surface for enabling the valve member to be shifted across the seat in response to shifting of the stem and to be rotated on the seat around the axis of the stem in response to rotation of the stem on its axis;

said valve member being formed with two through inlet holes for registering with the inlet ports of the seat selectively and proportionately as the valve member is shifted across the seat by shifting of the stem; and for registering with the inlet ports as the valve member is rotated axially around the axis of the stem on said seat; said openings communicating the undersurface of the valve member with its upper surface; said body having an outlet bore terminating in an outlet port communicating with that part of the body above the upper surface of the valve member.

8. A valve according to claim 7 including a sealing plate overlying said valve member and sealed thereto around the stem and also sealed at its outer edge to the body in said sealing zone outside the valve seat to form a sealed mixing chamber above and around the upper surface of the valve member outside the stem into which mixing chamber opens the holes of said valve member and also the outlet port;

said sealing plate having a central elongated slot through which the stem projects to be exposed as a handle, with such slot limiting travel of the stem for valve member shifting to a straight line path.

9. A valve according to claim 8 including a hold-down means connected to the body and overlying the sealing plate to hold down such sealing plate and the valve member in relatively sealed and assembled relation with respect to the valve seat and the sealing zone of the body to seal the mixing chamber from the stem receiving slot of the sealing plate;

with the valve member stem projecting through a central hole of the hold-down means alined with the central slot of the sealing plate to be exposed as a handle.

10. In combination, a valve body having an exposed convexedly domed upper surface exposing two inlet ports;

a valve cap sealing said body upper surface in an outermost zone and defining within the cap and above a valve member on said body upper surface an enclosed and sealed valve chamber;

a plate-like valving member in said valve chamber having a concave under surface seated against said body surface and having a handle exposed through a central opening in said cap;

said valving member having two through inlet passages between the handle and the outer edge of the valving member, communicating the under and upper surfaces of the valving member;

said valving member being sealed to said cap in a zone between the cap opening and said inlet passages to define part of the valve chamber as a sealed mixing chamber into which the inlet passages open; said body having an outlet bore terminating in an outlet port opening into said mixing chamber around the outside of the valving member and outside the inlet passages;

said valve member being so mounted in said valve chamber as to be movable in two different manners;

one movement being a bodily shifting of the valve member in said valve chamber;

the other manner of movement being an in-situ rotation of the valving member on the axis of its handle; such movements controlling the effective openings of the inlet ports and thus proportioning flow out of such inlet ports through the inlet passages of the valve member and into the mixing chamber; and also exposing selected areas of said inlet ports for volume control and thus determining the quantity of flow into the mixing chamber from the inlet ports.

References Cited by the Examiner

UNITED STATES PATENTS

| | | | |
|---|---|---|---|
| 2,090,165 | 8/1937 | Werner | 137—625.41 X |
| 3,156,260 | 11/1964 | Harvey | 137—625.41 |
| 3,159,181 | 12/1964 | Harke | 137—625.4 |
| 3,167,086 | 1/1965 | Michalski | 137—625.41 X |

M. CARY NELSON, *Primary Examiner.*

A. JAFFE, *Examiner.*